(12) United States Patent
Addepalli

(10) Patent No.: US 10,374,954 B1
(45) Date of Patent: Aug. 6, 2019

(54) APPARATUS, SYSTEM, AND METHOD FOR INCREASING HASHING EFFICIENCY IN NETWORK DEVICES

(71) Applicant: Juniper Networks, Inc., Sunnyvale, CA (US)

(72) Inventor: Meher Aditya Kumar Addepalli, Cupertino, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 308 days.

(21) Appl. No.: 15/283,291

(22) Filed: Oct. 1, 2016

(51) Int. Cl.
*H04L 12/707* (2013.01)
*H04L 12/743* (2013.01)
*H04L 12/755* (2013.01)

(52) U.S. Cl.
CPC ........ *H04L 45/7453* (2013.01); *H04L 45/021* (2013.01); *H04L 45/22* (2013.01)

(58) Field of Classification Search
None
See application file for complete search history.

(56) References Cited

U.S. PATENT DOCUMENTS

| 6,735,670 | B1 * | 5/2004 | Bronstein | H04L 45/745 |
| | | | | 365/49.1 |
| 8,259,585 | B1 * | 9/2012 | S P | H04L 45/125 |
| | | | | 370/237 |
| 8,938,469 | B1 * | 1/2015 | Keen | H04L 45/7453 |
| | | | | 707/747 |
| 2006/0153382 | A1 | 7/2006 | Mai | |
| 2007/0168377 | A1 * | 7/2007 | Zabarsky | H04L 45/00 |
| 2013/0343377 | A1 * | 12/2013 | Stroud | H04L 45/7453 |
| | | | | 370/389 |
| 2015/0312144 | A1 * | 10/2015 | Gobriel | H04L 45/7453 |
| | | | | 709/242 |

* cited by examiner

*Primary Examiner* — Chirag G Shah
*Assistant Examiner* — Srinivasa R Reddivalam
(74) *Attorney, Agent, or Firm* — FisherBroyles, LLP

(57) ABSTRACT

The disclosed apparatus may include a processing unit that (1) identifies an initial forwarding key that corresponds to a forwarding feature of a network device, (2) identifies an initial hash value that represents the initial forwarding key and is derived from the initial forwarding key, (3) identifies an additional forwarding key that corresponds to the forwarding feature of the network device, (4) determines that the initial forwarding key and the additional forwarding key exceed a threshold level of similarity relative to one another, (5) derives an additional hash value that represents the additional forwarding key by applying the initial forwarding key and the initial hash value as inputs to a hash function, and then (6) implements the additional hash value in connection with the forwarding feature of the network device and the forwarding information stored in the storage device. Various other apparatuses, systems, and methods are also disclosed.

20 Claims, 9 Drawing Sheets

Apparatus 100
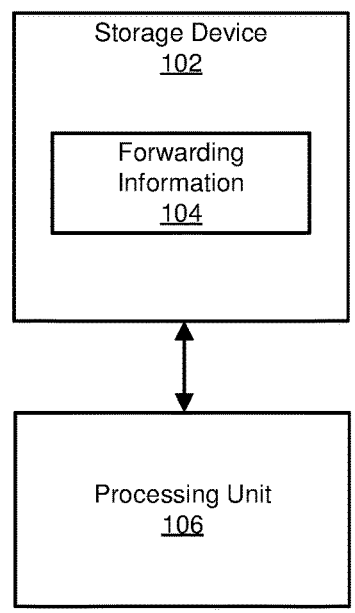
FIG. 1

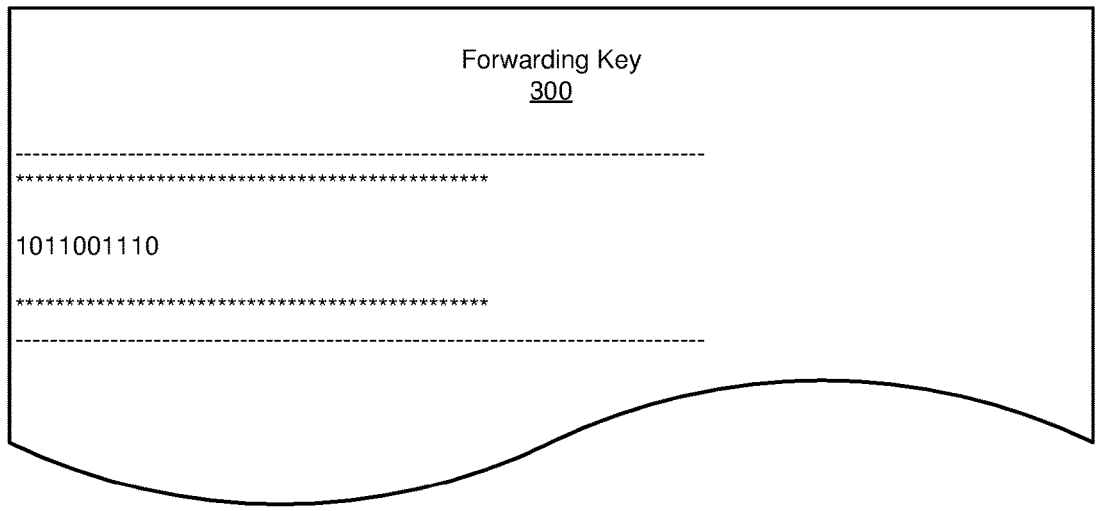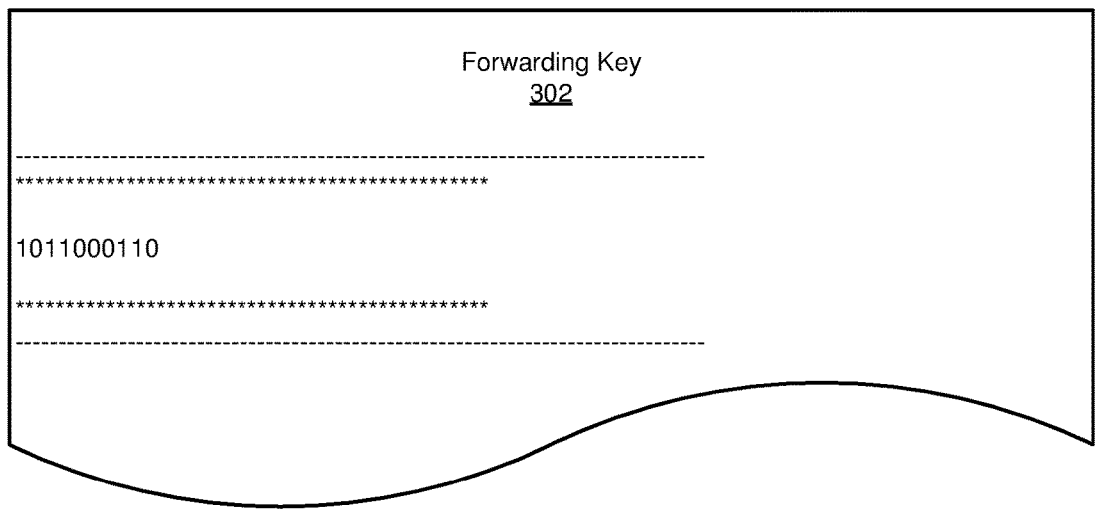
FIG. 3

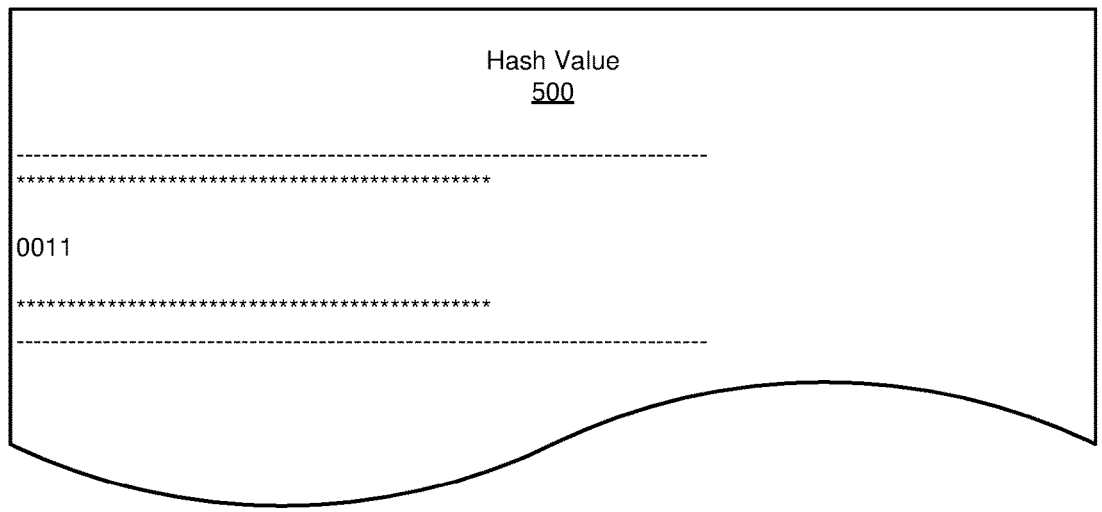
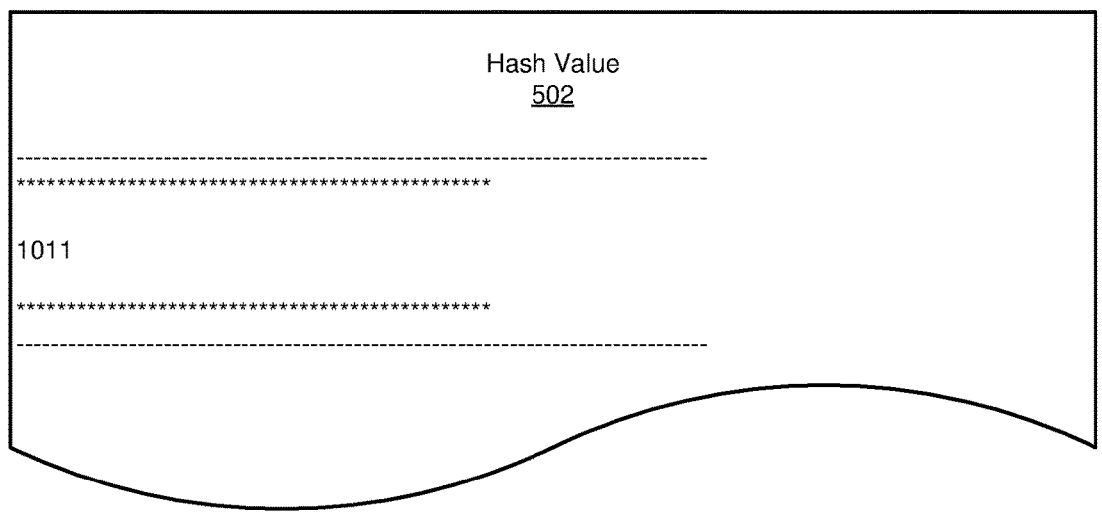
FIG. 5

| Clock Cycle | Q4 | Q3 | Q2 | Q1 |
|---|---|---|---|---|
| | State Table 702 | | | |
| 1 | 0 | 0 | 0 | $d_0$ |
| 2 | 0 | 0 | $d_0$ | $d_1$ |
| 3 | 0 | $d_0$ | $d_1$ | $d_2$ |
| 4 | $d_0$ | $d_1$ | $d_2$ | $d_3$ |
| 5 | $d_1$ | $d_2$ | $d_0 \wedge d_3$ | $d_0 \wedge d_4$ |
| 6 | $d_2$ | $d_0 \wedge d_3$ | $d_0 \wedge d_1 \wedge d_4$ | $d_1 \wedge d_5$ |
| 7 | $d_0 \wedge d_3$ | $d_0 \wedge d_1 \wedge d_4$ | $d_1 \wedge d_2 \wedge d_5$ | $d_2 \wedge d_6$ |
| 8 | $d_0 \wedge d_1 \wedge d_4$ | $d_1 \wedge d_2 \wedge d_5$ | $d_0 \wedge d_2 \wedge d_3 \wedge d_6$ | $d_0 \wedge d_3 \wedge d_7$ |
| 9 | $d_1 \wedge d_2 \wedge d_5$ | $d_0 \wedge d_2 \wedge d_3 \wedge d_6$ | $d_1 \wedge d_3 \wedge d_4 \wedge d_7$ | $d_0 \wedge d_1 \wedge d_4 \wedge d_8$ |
| 10 | $d_0 \wedge d_2 \wedge d_3 \wedge d_6$ | $d_1 \wedge d_3 \wedge d_4 \wedge d_7$ | $d_0 \wedge d_2 \wedge d_4 \wedge d_5 \wedge d_8$ | $d_1 \wedge d_2 \wedge d_5 \wedge d_9$ |

*FIG. 7*

APPARATUS, SYSTEM, AND METHOD FOR INCREASING HASHING EFFICIENCY IN NETWORK DEVICES

BACKGROUND

Network devices may perform hashing for a variety of reasons. For example, a network device may compute multiple hashes for each route and/or flow when programming a routing or forwarding table. In another example, a network device may compute multiple hashes for each route used to create a probabilistic route programming filter. Additionally or alternatively, a network device may compute multiple hashes for route and/or flow lookup.

Unfortunately, such hashing may consume a vast amount of computing resources in network devices. Such hashing may also take a lot of computing time, thereby slowing down the network devices and/or impairing their performance. The instant disclosure, therefore, identifies and addresses a need for improved and/or additional apparatuses, systems, and methods for increasing hashing efficiency in network devices.

SUMMARY

As will be described in greater detail below, the instant disclosure generally relates to apparatuses, systems, and methods for increasing hashing efficiency in network devices In one example, an apparatus for accomplishing such a task may include at least one storage device that facilitates storing forwarding information that enables a network device to forward traffic to other network devices within a network. The apparatus may also include at least one processing unit of the network device that is communicatively coupled to the storage device. This processing unit may (1) identify an initial forwarding key that corresponds to a forwarding feature of the network device, (2) identify an initial hash value that represents the initial forwarding key and is derived from the initial forwarding key, (3) identify an additional forwarding key that corresponds to the forwarding feature of the network device, (4) determine that the initial forwarding key and the additional forwarding key exceed a threshold level of similarity relative to one another, (5) derive, in response to that determination, an additional hash value that represents the additional forwarding key by applying the initial forwarding key and the initial hash value as inputs to a hash function, and then (6) implement the additional hash value in connection with the forwarding feature of the network device and the forwarding information stored in the storage device.

Similarly, a network device incorporating the above-described apparatus may include at least one storage device that stores a routing table for a set of routes that define paths to other network devices within the network. The network device may also include at least one processing unit of the network device that is communicatively coupled to the storage device. This processing unit may (1) identify an initial forwarding key that corresponds to a forwarding feature of the network device, (2) identify an initial hash value that represents the initial forwarding key and is derived from the initial forwarding key, (3) identify an additional forwarding key that corresponds to the forwarding feature of the network device, (4) determine that the initial forwarding key and the additional forwarding key exceed a threshold level of similarity relative to one another, (5) derive, in response to that determination, an additional hash value that represents the additional forwarding key by applying the initial forwarding key and the initial hash value as inputs to a hash function, and then (6) implement the additional hash value in connection with the forwarding feature of the network device and the forwarding information stored in the storage device.

A corresponding method may include (1) identifying an initial forwarding key that corresponds to a forwarding feature of a network device that facilitates forwarding traffic to other network devices within a network, (2) identifying an initial hash value that represents the initial forwarding key and is derived from the initial forwarding key, (3) identifying an additional forwarding key that corresponds to the forwarding feature of the network device, (4) determining that the initial forwarding key and the additional forwarding key exceed a threshold level of similarity relative to one another, (5) deriving, in response to that determination, an additional hash value that represents the additional forwarding key by applying the initial forwarding key and the initial hash value as inputs to a hash function, and then (6) implementing the additional hash value in connection with the forwarding feature of the network device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 1 is a block diagram of an exemplary apparatus for increasing hashing efficiency in network devices

FIG. 3 is an illustration of exemplary forwarding keys.

FIG. 5 is an illustration of exemplary hash values derived from exemplary forwarding keys.

FIG. 7 is an illustration of an exemplary state table that demonstrates how an exemplary linear feedback shift register computes hash values from forwarding keys.

Figure 2:
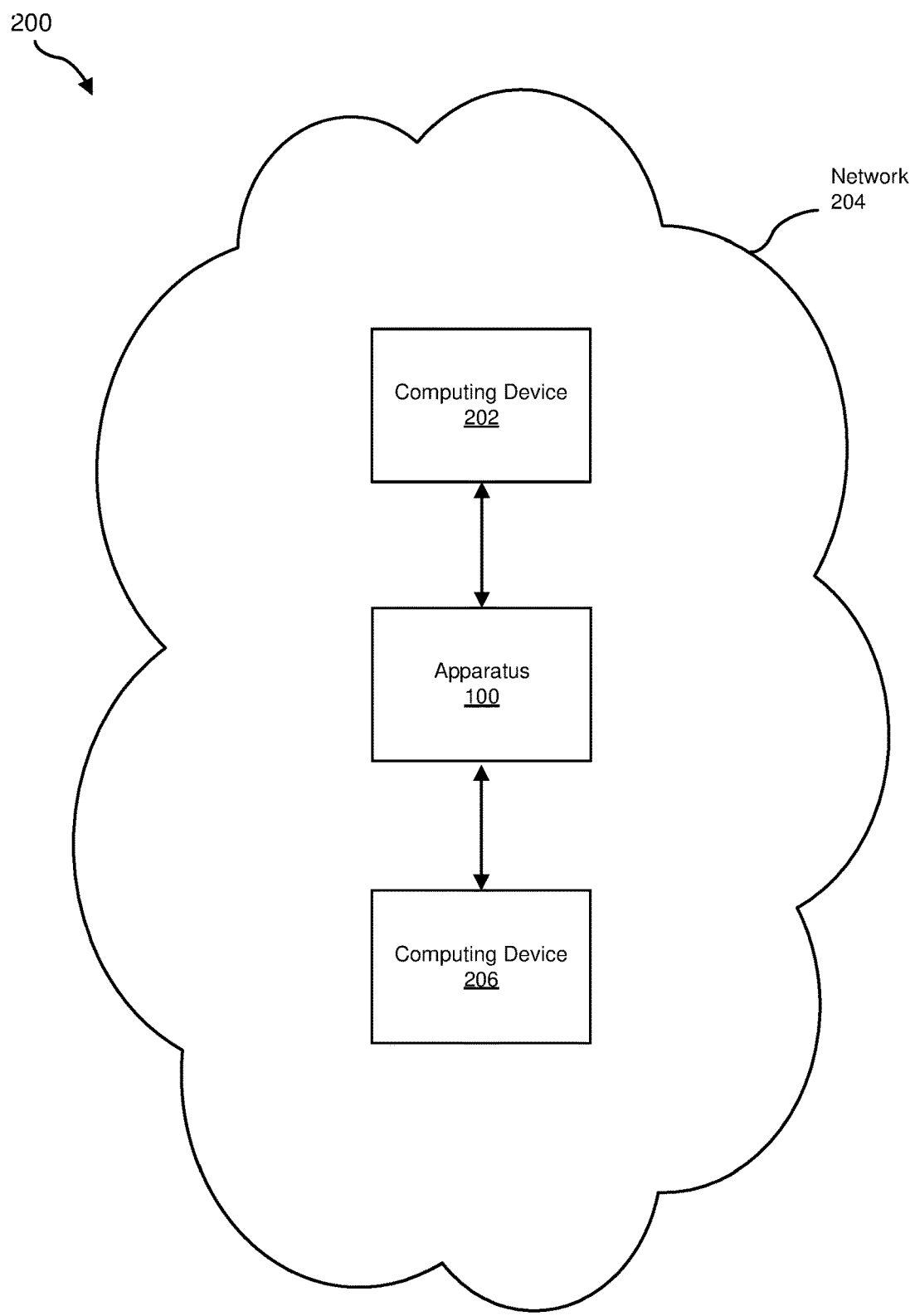
FIG. 2 is a block diagram of an exemplary implementation of an apparatus for increasing hashing efficiency in network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for increasing hashing efficiency in network devices.

As will be explained in greater detail below, embodiments of the instant disclosure may enable network devices to perform faster and/or more efficient hashing on certain keys and/or data in connection with routing and/or forwarding network traffic. As a result, these embodiments may reduce the amount of computing resources and/or time needed to program routing and/or forwarding tables, create probabilistic route programming filters (such as Bloom filters), perform route and/or flow lookup, and/or various other operations that involve hashing.

The following will provide, with reference to FIG. 1, examples of apparatuses that increase hashing efficiency in network devices. The discussion corresponding to FIG. 2 will provide a detailed description of implementations that facilitate increasing hashing efficiency in network devices. The discussion corresponding to FIGS. 3-7 will provide a detailed description of how the embodiments of the instant disclosure perform faster and/or more efficient hashing than traditional hashing. The discussion corresponding to FIG. 8 will provide a detailed description of an exemplary method for increasing hashing efficiency in network devices. Finally, the discussion corresponding to FIG. 9 will provide numerous examples of systems that may include the apparatus shown in FIG. 1.

FIG. 1 shows a block diagram of an exemplary apparatus 100 for increasing hashing efficiency in network devices. Examples of apparatus 100 include, without limitation, network devices, routers, switches, hubs, modems, bridges, repeaters, gateways, multiplexers, network adapters, servers, client devices, portions of one or more of the same, variations or combinations of one or more of the same, and/or any other suitable apparatus.

The phrase "to hash" or "hashing," as used herein, generally refers to any process and/or algorithm that transforms a character string into a smaller representation of the character string. In one example, hashing may involve generating, creating, and/or deriving a hash value from a hash key by way of a hash function. In this example, the hash key may include and/or represent a route that defines a path to a network device within a network. Additionally or alternatively, the hash key may include and/or represent a flow that facilitates forwarding traffic to a network device within a network.

In another example, the hash key may include and/or represent a network packet that is transferred from one network device to another. For example, the hash key may include and/or represent the header of a network packet and/or file. Additionally or alternatively, the hash key may include and/or represent data stored in memory on a network device.

As illustrated in FIG. 1, apparatus 100 may include one or more storage devices, such as storage device 102. Storage device 102 generally represents any type or form of volatile or non-volatile storage device or medium capable of storing data and/or computer-readable instructions. Examples of storage device 102 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some examples, storage device 102 may store and/or maintain forwarding information 104. In one example, forwarding information 104 may include and/or represent a routing table or Routing Information Base (RIB). In another example, forwarding information 104 may include and/or represent a forwarding table or Forwarding Information Base (FIB). Additionally or alternatively, forwarding information 104 may include and/or represent one or more databases that store network routes.

As illustrated in FIG. 1, exemplary system 100 may also include one or more processing units, such as processing unit 106. Processing unit 106 generally represents any type or form of hardware-implemented processing unit capable of interpreting and/or executing computer-readable instructions. In one example, processing unit 106 may access and/or modify forwarding information 104 in storage device 102. Examples of processing unit 106 include, without limitation, physical processors, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable processing unit.

System 100 in FIG. 1 may be implemented in a variety of ways and/or contexts. As a specific example, FIG. 2 shows a block diagram of an exemplary implementation 200 that includes apparatus 100 for increasing hashing efficiency. As illustrated in FIG. 2, implementation 200 may include a network 204 that consists of multiple computing devices. For example, network 204 may include and/or represent computing device 202, computing device 206, and/or apparatus 100. In this example, computing devices 202 and 206 may be able to exchange communications with one another via apparatus 100.

Computing devices 202 and 206 each generally represent any type or form of computing device capable of reading computer-executable instructions. In one example, computing devices 202 and 206 may each include and/or represent a network device (such as a router, switch, and/or gateway). Additional examples of computing devices 202 and 206 include, without limitation, client devices, servers, laptops, tablets, desktops, storage devices, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing devices.

Network 204 generally represents any medium or architecture capable of facilitating communication or data transfer. In one example, network 204 may facilitate communication between computing devices 202 and 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although not necessarily illustrated in this way in FIG. 2, network 204 may also include and/or represent various other computing devices in addition to computing devices 202 and 206 and apparatus 100.

In some examples, processing unit 106 of apparatus 100 may identify an initial forwarding key that corresponds to a forwarding feature of apparatus 100. The term "forwarding key," as used herein, generally refers to any type or form of input data that is hashed in connection with a forwarding feature of a network device. In one example, the forwarding key may be limited to a fixed length and/or size. Examples of such a forwarding key include, without limitation, routes, flows, packets, files, headers, metadata, stored data, combinations or variations of one or more of the same, and/or any other suitable forwarding key.

The term "forwarding feature," as used herein, generally refers to any type or form of function that facilitates forwarding traffic and/or is involved in the same. Examples of such a forwarding feature include, without limitation, hardware-based packet forwarding, flow-based packet forwarding, Cyclic Redundancy Checks (CRCs), checksum validations (e.g., header checksum validations), combinations or variations of one or more of the same, and/or any other suitable forwarding feature.

In some examples, processing unit 106 of apparatus 100 may identify an initial hash value that represents the initial forwarding key and is derived from the initial forwarding key. In one example, processing unit 106 may derive the initial hash value by performing a type of binary division on the initial forwarding key. Additionally or alternatively, processing unit 106 may derive the initial hash value by performing a logical eXclusive OR (XOR) operation on the initial forwarding key. Processing unit 106 may also obtain the initial hash value from another computing device.

In some examples, processing unit 106 of apparatus 100 may identify an additional forwarding key that corresponds to the forwarding feature of apparatus 100. In one example, processing unit 106 may determine that the initial forwarding key and the additional forwarding key exceed a threshold level of similarity relative to one another. In other words, processing unit 106 may determine that the additional forwarding key is similar enough to the initial forwarding key that the additional forwarding key's hash value can be derived by applying the initial forwarding key and the initial hash value as inputs to a hash function. By deriving the additional forwarding key's hash value in this way, processing unit 106 may be able to avoid deriving the additional forwarding key's hash value directly from the additional forwarding key by way of traditional techniques. In doing so, processing unit 106 may perform faster and/or more efficient hashing on the additional forwarding key in connection with routing and/or forwarding network traffic.

In some examples, processing unit 106 of apparatus 100 may implement the additional forwarding key's hash value in connection with the forwarding feature of apparatus 100 and/or forwarding information 104. As a specific example, forwarding information 104 may include and/or represent a routing table that includes a set of routes that define paths to computing devices 202 and 206 among others. In this example, the forwarding feature of apparatus 100 may include and/or represent hardware-based packet forwarding to such computing devices. Processing unit 106 may identify a route that defines the path to computing device 202 within network 204. Processing unit 106 may also identify a hash value that represents and is derived from that route.

Continuing with this example, processing unit 106 may identify a route that defines the path to computing device 206 within network 204. Processing unit 106 may then determine that the route to computing device 202 and the route to computing device 206 are very similar to one another. For example, processing unit 106 may determine that these routes differ by only a single bit of data. In another example, processing unit 106 may determine that these routes differ by only a single byte of data.

In some examples, processing unit 106 may identify a threshold that represents the maximum amount of allowable difference between routes. In other words, in the event that the routes exceed a threshold level of similarity relative to one another, processing unit 106 may derive the hash value of the route to computing device 206 by applying the route to computing device 202 and its corresponding hash value to a hash function. On the other hand, in the event that the routes do not reach the threshold level of similarity, processing unit 106 may be unable to derive the hash value of the route to computing device 206 in that way without additional recursive computation.

Hash values may be used and/or applied in a variety of ways and/or contexts. For example, processing unit 106 may need and/or use such hash values to program a routing or forwarding table with routes and/or flows. In another example, processing unit 106 may create and/or train a probabilistic route programming filter with such hash values. For example, processing unit 106 may apply these hash values as elements of a Bloom filter that facilitates probabilistic route programming on apparatus 100. Additionally or alternatively, processing unit 106 may use these hash values for route lookup in connection with packet forwarding.

In another example, forwarding information 104 may include and/or represent a routing table that consists of a set of flows that facilitate forwarding traffic to computing devices 202 and 206 among others. In this example, the forwarding feature of apparatus 100 may include and/or represent flow-based packet forwarding to such computing devices. Processing unit 106 may identify a flow that facilitates forwarding traffic to computing device 202 within network 204. Processing unit 106 may also identify a hash value that represents and is derived from that flow.

Continuing with this example, processing unit 106 may identify a flow that facilitates forwarding traffic to computing device 206 within network 204. Processing unit 106 may then determine that the flow for computing device 202 and the flow for computing device 206 are very similar to one another. For example, processing unit 106 may determine that these flows differ by only one attribute and/or match condition. In another example, processing unit 106 may determine that these routes differ by only a few attributes and/or match conditions.

In some examples, processing unit 106 may identify a threshold that represents the maximum amount of allowable difference between flows. In other words, in the event that the flows exceed a threshold level of similarity relative to one another, processing unit 106 may derive the hash value of the flow for computing device 206 by applying the flow for computing device 202 and its corresponding hash value to a hash function. On the other hand, in the event that the flows do not reach the threshold level of similarity, processing unit 106 may be unable to derive the hash value of the flow for computing device 206 in that way without additional recursive computation.

In some examples, a specific hash value may need to be computed and/or derived only once. For example, processing unit 106 may pre-compute the hash value of a route to computing device 202 only a single time per routing table. In one example, processing unit 106 may compute many or all of the hash values of the routes within network 204 before apparatus 100 begins forwarding traffic to other computing devices within network 204. Processing unit 106 may then program the routing table with the resulting hash values before apparatus 100 begins forwarding traffic to those other computing devices.

FIG. 3 illustrates exemplary forwarding keys 300 and 302. As illustrated in FIG. 3, forwarding key 300 may include and/or represent a route prefix of "1011001110". In this example, forwarding key 302 may include and/or represent a route prefix of "1011000110". These route prefixes may correspond to a hardware-based packet forwarding feature of apparatus 100. For example, these route prefixes may define paths to computing devices 202 and 206 within network 204.

Figure 4:
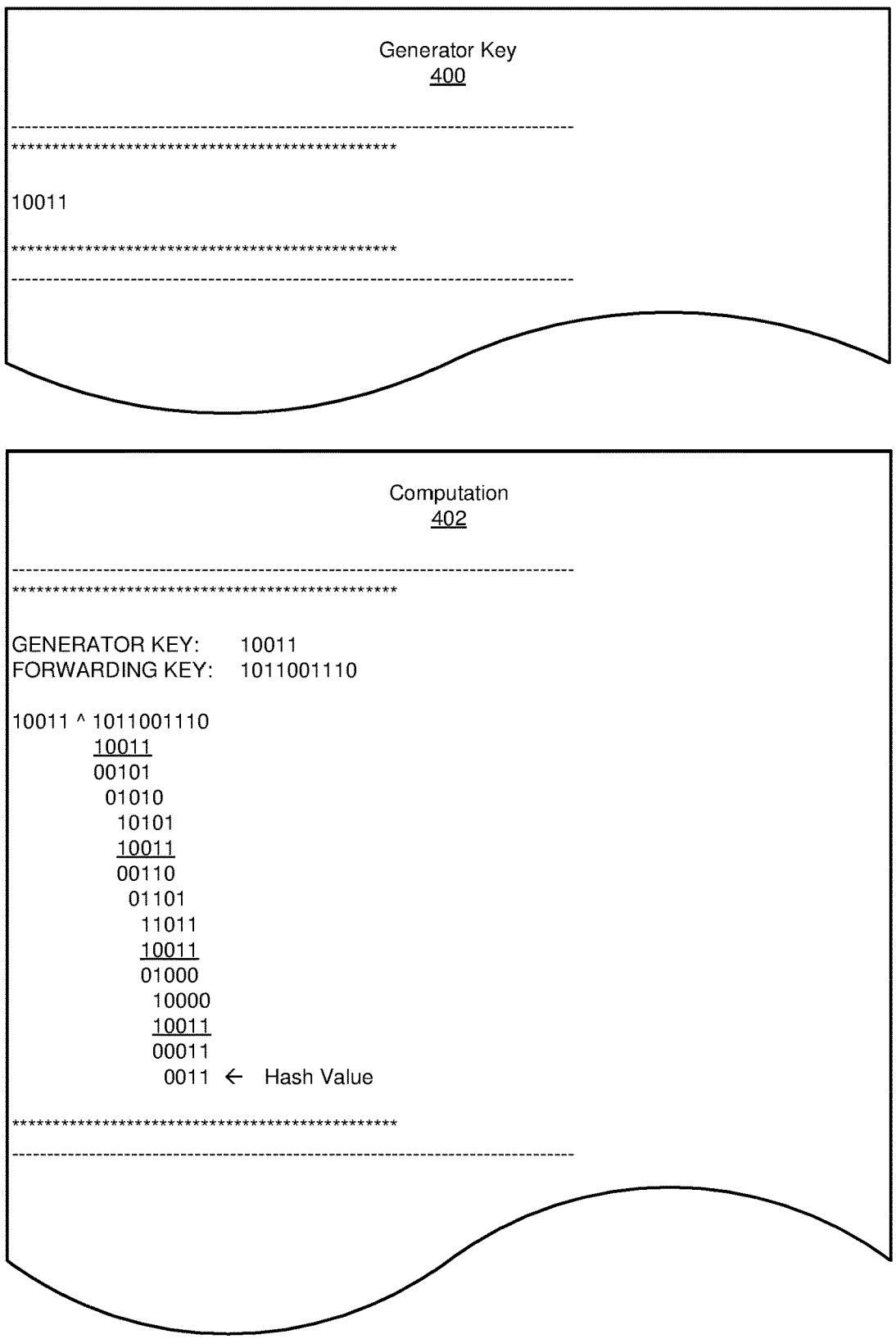
FIG. 4 is an illustration of an exemplary generator key and an exemplary computation.

FIG. 4 illustrates an exemplary generator key 400 and an exemplary computation 402. As illustrated in FIG. 4, generator key 400 may include and/or represent a binary string of "10011". In this example, generator key 400 may correspond to one of four different ASICs on apparatus 100. The other ASICs may each have their own generator key that differs from generator key 400. These ASICs may each need to compute a hash value for each route using their own generator key.

In one example, processing unit 106 may include and/or represent the ASIC with generator key 400. Additionally or alternatively, processing unit 106 may include and/or represent an ASIC and/or processor that is separate and distinct from the ASIC with generator key 400.

As a specific example, processing unit 106 and/or the ASIC with generator key 400 may perform computation 402 in FIG. 4. As illustrated in FIG. 4, computation 402 may involve deriving a hash value of forwarding key 300 by performing a logical XOR operation on forwarding key 300 and generator key 400. More specifically, computation 402 may involve an XOR operation whose inputs are "10011" and "1011001110". This XOR operation may produce a hash value of "0011" for forwarding key 300.

In some examples, a hash value may include and/or represent the remainder of an XOR operation or a polynomial division operation involving a forwarding key and a generator key. For example, forwarding key 300 may be represented as polynomial $p(x)=1*x^9+0*x^8+1*x^7+1*x^6+0+x^5+0*x^4+1*x^3+1*x^2+1*x^1+0+x^0$ with Galois fields of size 2 as coefficients. In this example, the bits in forwarding key 300 may constitute and/or form the coefficients of polynomial $p(x)$. Similarly, generator key 400 may be represented as a polynomial $g(x)=1*x^4+0*x^3+0*x^2+1*x^1+1+x^0$. Accordingly, hash value 500 may be represented as $$r(x) = \text{remainder}\left(\frac{p(x)}{g(x)}\right).$$

FIG. 5 illustrates exemplary hash values 500 and 502. As illustrated in FIG. 5, hash value 500 may include and/or represent a binary string of "0011". In this example, hash value 500 may correspond to forwarding key 300. Hash value 502 may include and/or represent a binary string of "1011". In this example, hash value 502 may correspond to forwarding key 302.

Processing unit 106 and/or the ASIC with generator key 400 may compute and/or derive hash value 502 by applying forwarding key 300 and corresponding hash value 500 as inputs to a hash function. In doing so, processing unit 106 and/or the ASIC may avoid computing and/or deriving hash value 502 directly from forwarding key 302. By avoiding computing and/or deriving hash value 502 directly from forwarding key 302, processing unit 106 and/or the ASIC may reduce the amount of computing resources and/or time needed to program routing and/or forwarding tables, create probabilistic route programming filters (such as Bloom filters), perform route and/or flow lookup, and/or various other operations that involve hashing.

Figure 6:
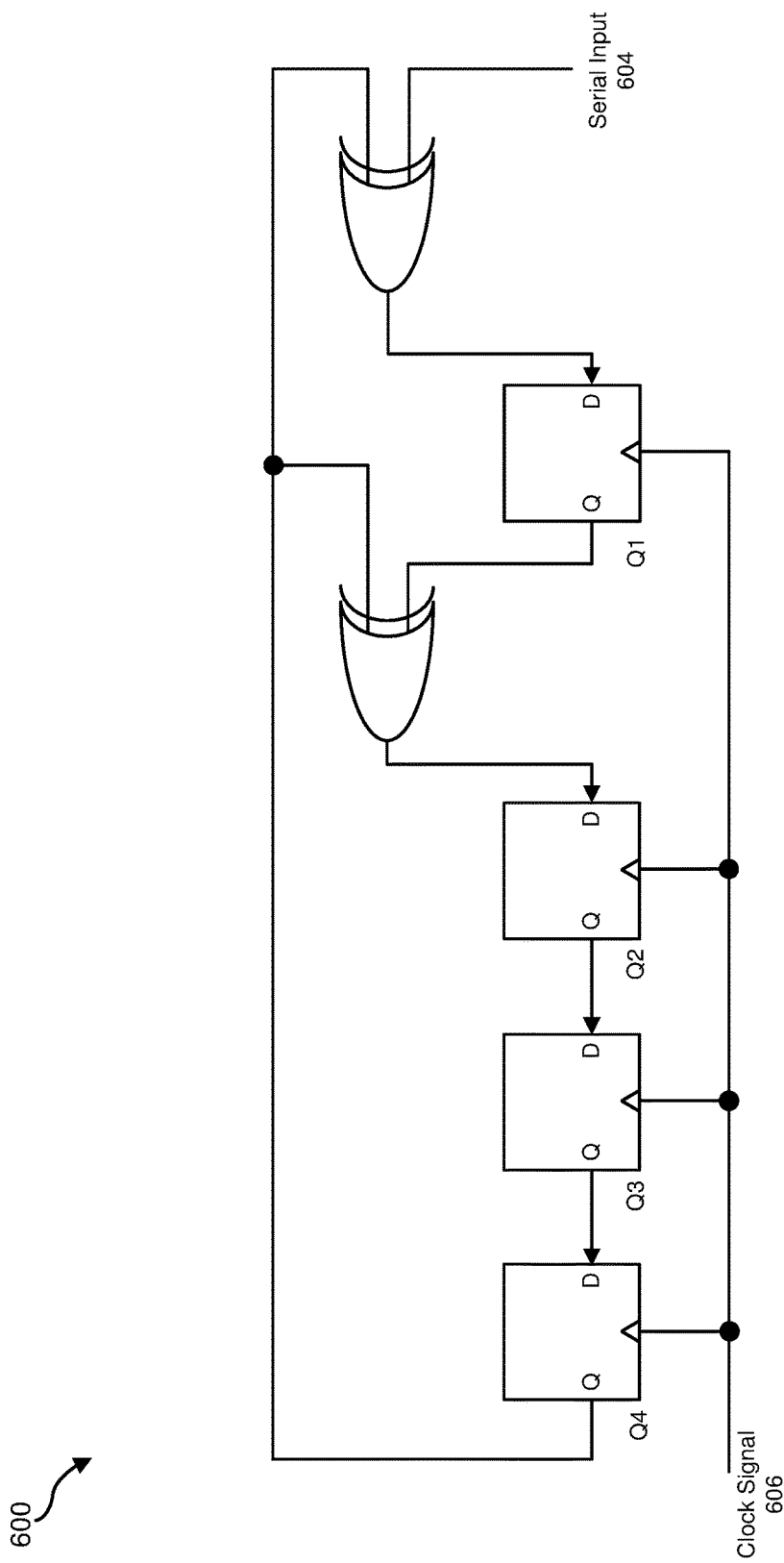
FIG. 6 is a block diagram of an exemplary linear feedback shift register capable of computing hash values from forwarding keys.

FIG. 6 illustrates an exemplary linear feedback shift register 600 capable of performing logical XOR operations on forwarding keys. In one example, linear feedback shift register 600 may be programmed and/or configured specifically for generator key 400. In this example, linear feedback shift register 600 may include a serial input 604, a clock signal 606, a couple of XOR gates, and a set of 4 flip-flops (Q1, Q2, Q3, and Q4).

In one example, processing unit 106 and/or the ASIC may include and/or use linear feedback shift register 600 to compute and/or derive hash value 500 from forwarding key 300. For example, processing unit 106 and/or the ASIC may feed forwarding key 300 into serial input 604 in FIG. 6. In this example, linear feedback shift register 600 may clock through forwarding key 300 as forwarding key 300 is serially fed to serial input 604 and propagates through the flip-flops, thereby producing hash value 500.

Additionally or alternatively, processing unit 106 and/or the ASIC may include and/or use linear feedback shift register 600 to compute and/or derive hash value 502 from forwarding key 302. For example, processing unit 106 and/or the ASIC may feed forwarding key 302 into serial input 604 in FIG. 6. In this example, linear feedback shift register 600 may clock through forwarding key 302 as forwarding key 302 is serially fed to serial input 604 and propagates through the flip-flops, thereby producing hash value 502.

FIG. 7 illustrates an exemplary state table 702 that identifies the state of linear feedback shift register 600 in FIG. 6 over the course of 10 clock cycles. As illustrated in FIG. 7, state table 702 may indicate that flip-flops Q2, Q3, and Q4 are initialized to zero for the first clock cycle. However, for this clock cycle, linear feedback shift register 600 may feed the first bit of the forwarding key whose hash is being derived to flip-flop Q1. In this example, the first bit fed to flip-flop Q1 may include and/or represent the Most Significant Bit (MSB) of the forwarding key.

By the tenth clock cycle, the state of flip-flops Q1, Q2, Q3, and Q4 may be defined by and/or reduced to a mask and/or equation. For example, Q1 may be defined by and/or reduced to the XOR operation "$d_1 \char`^ d_2 \char`^ d_5 \char`^ d_9$" (e.g., $Q1=d_1\char`^d_2\char`^d_5\char`^d_9$). In this example, Q2 may be defined by and/or reduced to the XOR operation "$d_0\char`^d_2\char`^d_4\char`^d_5\char`^d_8$" (e.g., $Q2=d_0\char`^d_2\char`^d_4\char`^d_5\char`^d_8$). Further, Q3 may be defined by and/or reduced to the XOR operation "$d_1\char`^d_3\char`^d_4\char`^d_7$" (e.g., $Q3=d_1\char`^d_3\char`^d_4\char`^d_7$). Finally, Q4 may be defined by and/or reduced to the XOR operation "$d_0\char`^d_2\char`^d_3\char`^d_6$" (e.g., $Q4=d_0\char`^d_2\char`^d_3\char`^d_6$).

In this example, the forwarding key may be represented as "$d_0d_1d_2d_3d_4d_5d_6d_7d_8d_9$" such that the MSB is $d_0$ and the Least Significant Bit (LSB) is "$d_9$". The resulting hash value for the forwarding key may be represented as "Q4Q3Q2Q1". For example, processing unit 106 and/or the ASIC with generator key 400 may compute and/or derive hash value 500 for forwarding key 300 by calculating $Q1=0\char`^1\char`^0\char`^0=1$, $Q2=1\char`^1\char`^0\char`^0\char`^1=1$, $Q3=0\char`^1\char`^0\char`^1=0$, and $Q4=1\char`^1\char`^1\char`^1=0$. Accordingly, the resulting hash value for forwarding key 300 may be represented as "0011".

Similarly, processing unit 106 and/or the ASIC with generator key 400 may compute and/or derive hash value 502 for forwarding key 302 by calculating Q1=0^1^0^0=1, Q2=1^1^0^0^1=1, Q3=0^1^0^1=0, and Q4=1^1^1^0=1. Accordingly, the resulting hash value for forwarding key 302 may be represented as "1011".

In some examples, processing unit 106 and/or the ASIC may operate under certain rules and/or lemmas. As an example, a $1^{st}$ lemma may be that an all zero forwarding key produces and/or yields an all zero hash value. In this example, a $2^{nd}$ lemma may be that, if an initial forwarding key (e.g., p(x)) yields an initial hash value (e.g., r(x)), then a slightly different forwarding key (e.g., p'(x)) may yield a different hash value (e.g., r'(x)). Continuing with this example, another forwarding key (e.g., p"(x)) may equal and/or be defined by the result of an XOR operation performed on the initial forwarding key and the slightly different forwarding key (e.g., p"(x)=p(x)^p'(x)), and the hash value of this other forwarding key (e.g., r"(x)) may equal and/or be defined by the result of an XOR operation performed on the initial hash value and the different hash value (e.g., r"(x)=r(x)^r'(x)).

Further, a $3^{rd}$ lemma may be that, if the initial forwarding key (e.g., p(x)) and the slightly different forwarding key (e.g., p'(x)) differ by only a certain number of data chunks (e.g., m data chunks), then the hash value of the slightly different forwarding key (e.g., r'(x)) may be derived and/or computed from the hash value of the initial forwarding key (e.g., r(x)) by performing that same number of XOR operations (e.g., m XOR operations). In this example, the $3^{rd}$ lemma may necessitate the knowledge of which indexes correspond to the chunks that differ between the initial forwarding key and the slightly different forwarding key.

By applying these lemmas, processing unit 106 and/or the ASIC may hash all of the forwarding keys for a particular hardware block (e.g., i) using the block's generator key (e.g., j). In one example, each of these forwarding keys may consist of 48 bytes. In this example, processing unit 106 and/or the ASIC may create and/or populate a lookup table configured as a matrix with "h" dimensions. Processing unit 106 and/or the ASIC may create and/or populate the lookup table in accordance with the following pseudocode:

For byte_index: 0→47
$r_{ij}(x)=r_{ij}(x)^h[j][byte\_index][hk[byte\_idx]]$
End.

In this example, the $r_{ij}(x)$ lookup table may be initialized to "0" for a zero-initialized left linear feedback shift register-based hash calculation. In addition, the h[j][byte_index][hk[byte_idx]] matrix may be derived from the masks and/or equations shown at the tenth clock cycle of state table 702 in FIG. 7.

This matrix may enable processing unit 106 and/or the ASIC to derive and/or compute the hash value of a key that is slightly different from another key. As a result, by incrementing the variables in that pseudocode and/or continuing to process all of the possible iterations, processing unit 106 and/or the ASIC may be able to recursively derive and/or compute the hash values for all possible forwarding keys within a given range. In other words, processing unit 106 and/or the ASIC may recursively use hash values for all possible forwarding keys within the given range by applying the forwarding key's predecessor and its corresponding hash value as inputs to the hash function.

Accordingly, processing unit 106 and/or the ASIC may apply these techniques to perform incremental updates for forwarding keys that are only slightly different from one another. Additionally or alternatively, processing unit 106 and/or the ASIC may apply these techniques to recursively derive the hash value for any hash key irrespective of how much that hash key differs from the initial hash key.

In one example, processing unit 106 and/or the ASIC may initially create, generate, and/or derive a hash for an all zero Internet Protocol (IP) address hash key. In this example, processing unit 106 and/or the ASIC may later update the IP address with the corresponding value of the route prefix being programmed. This update may lead to and/or result in a delta of 4 bytes for IP version 4 (IPv4). Accordingly, processing unit 106 and/or the ASIC may create, generate, and/or derive a hash for any new IPv4 route prefix in just 4 XOR operations.

Continuing with this example, processing unit 106 and/or the ASIC may need to compute hash values for various structures. The hash keys for these structures may differ from one another by only a couple of bits (e.g., 2 bits). As a result, processing unit 106 and/or the ASIC may be able to create, generate, and/or derive the hash values of one structure from the hash values of another structure.

As a specific example, $(R_i, S_j)$ may represent a hash value for structure $S_j$ of route $R_i$. In this example, each route may necessitate 4 different hash values for 4 different structures. To derive these hash values, processing unit 106 and/or the ASIC may start by computing a hash value for $(R_0, S_0)$ from which all of the remaining hash values are derived. This process of derivation may be described represented by the following sequence:

$$(R_0, S_0) \to (R_0, S_1) \to (R_0, S_2) \to (R_0, S_3)$$
$$\downarrow$$
$$(R_1, S_0) \to (R_1, S_1) \to (R_1, S_2) \to (R_1, S_3).$$

Figure 8:
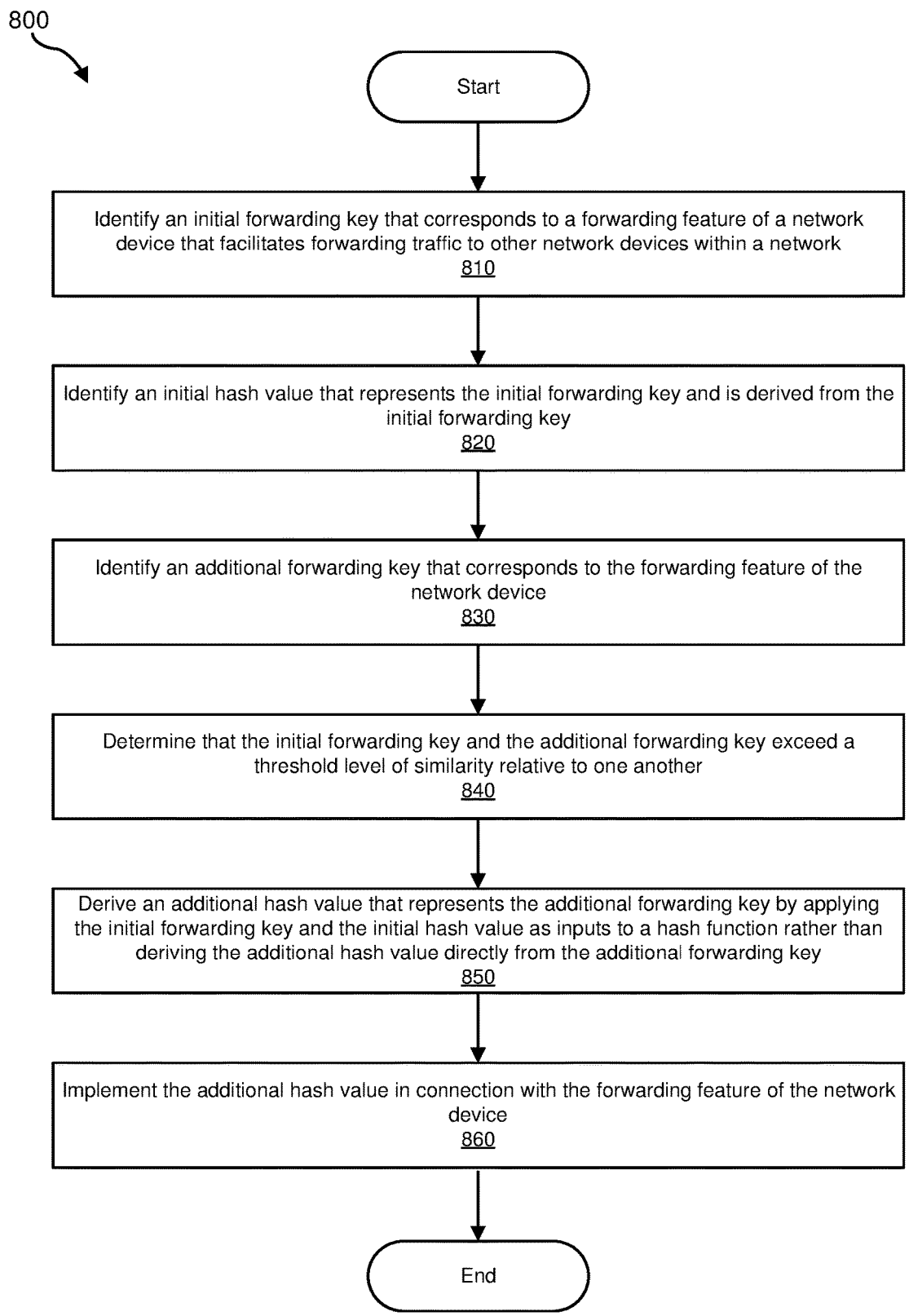
FIG. 8 is a flow diagram of an exemplary method for increasing hashing efficiency in network devices.

FIG. 8 is a flow diagram of an exemplary method 800 for increasing hashing efficiency in network devices. Method 800 may include the step of identifying an initial forwarding key that corresponds to a forwarding feature of a network device that facilitates forwarding traffic to other network devices within a network (810). This identifying step may be performed in a variety of ways. For example, a network device may identify a root forwarding key (e.g., an all zero key) when computing, programming, and/or populating a routing table. Additionally or alternatively, a network device may identify a forwarding key (e.g., a source or destination address) from a packet received from another network device.

Returning to FIG. 8, method 800 may also include the step of identifying an initial hash value that represents the initial forwarding key and is derived from the initial forwarding key (820). This identifying step may be performed in a variety of ways. For example, a network device may compute and/or derive a hash value for a forwarding key by division, logical XOR operations, and/or hash functions. Additionally or alternatively, a network device may receive a hash value for the forwarding key from another network device.

Returning to FIG. 8, method 800 may also include the step of identifying an additional forwarding key that corresponds to the forwarding feature of the network device (830). This identifying step may be performed in a variety of ways. For example, a network device may increment the initial forwarding key by one unit to arrive at the additional forwarding key when computing, programming, and/or populating a routing table. Additionally or alternatively, a network device may identify the additional forwarding key (e.g., a source or destination address) from a packet received from another network device.

Returning to FIG. 8, method 800 may also include the step of determining that the initial forwarding key and the additional forwarding key exceed a threshold level of similarity relative to one another (840). This determining step may be performed in a variety of ways. For example, a network device may know that the additional forwarding key is only slightly different from the initial forwarding key in the event that the network device creates the additional forwarding key by incrementing the initial forwarding key. Additionally or alternatively, a network device may perform a bitwise comparison of the forwarding keys and then determine that they are substantially similar based at least in part on this comparison.

Returning to FIG. 8, method 800 may also include the step of deriving an additional hash value that represents the additional forwarding key by applying the initial forwarding key and the initial hash value as inputs to a hash function (850). This deriving step may be performed in a variety of ways. For example, a network device may enter the initial forwarding key and the initial hash value as inputs into an XOR operation. In this example, the XOR operation may output and/or produce a hash value that corresponds to the additional forwarding key.

Additionally or alternatively, a network device may calculate a hash value for the additional forwarding key by applying XOR masks to the additional forwarding key. In this example, the XOR masks may output and/or produce the hash value for the additional forwarding key.

Returning to FIG. 8, method 800 may also include the step of implementing the hash value for the additional forwarding key in connection with the forwarding feature of the network device (860). This implementing step may be performed in a variety of ways. For example, a network device may implement the hash value for the additional forwarding key by programming a routing or forwarding table with that hash value. In another example, a network device may create and/or train a Bloom filter using the hash value as an element. In a further example, a network device may perform route and/or flow lookup using the hash value as a database key.

Figure 9:
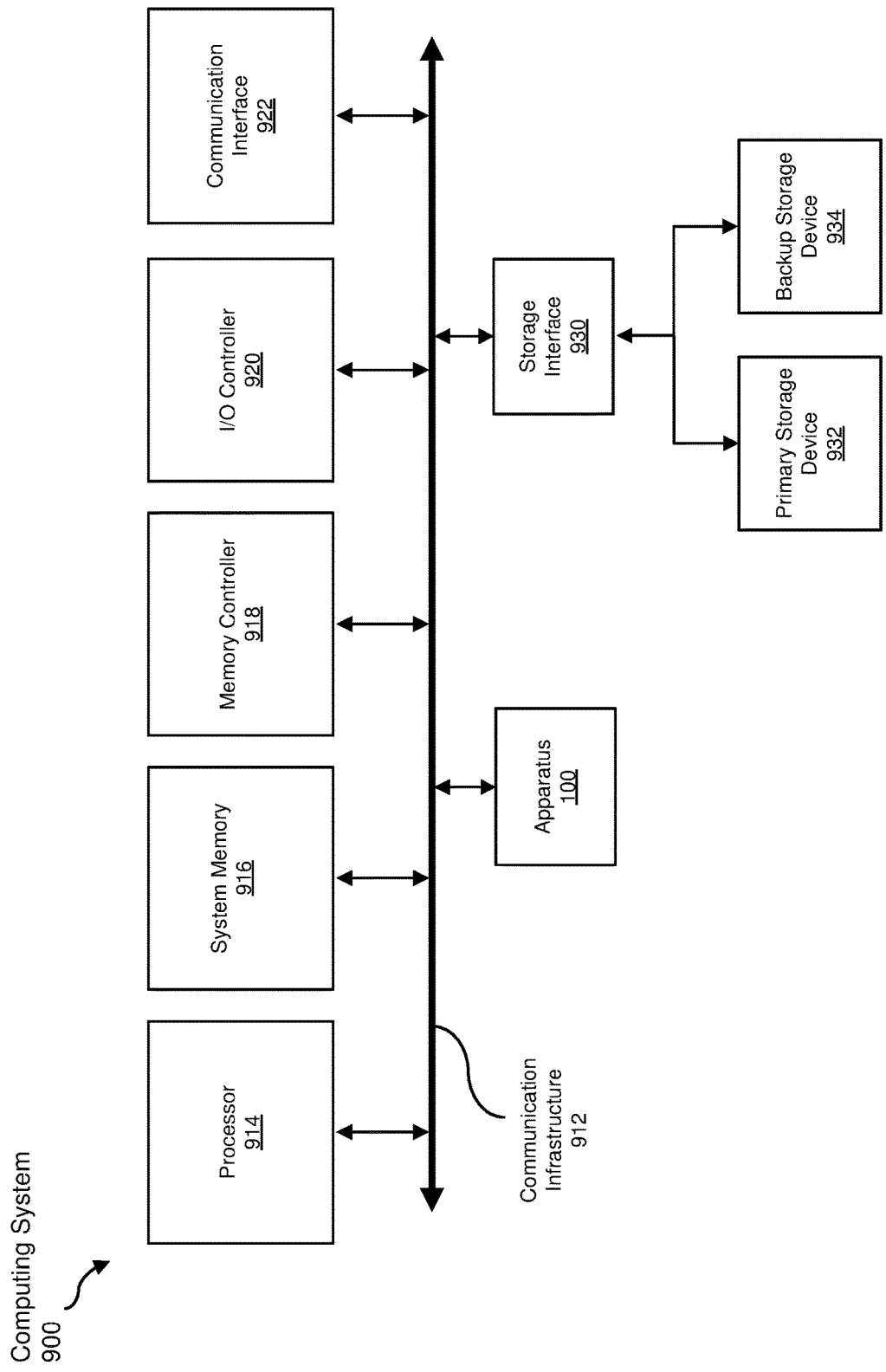
FIG. 9 is a block diagram of an exemplary computing system capable of implementing and/or being used in connection with one or more of the embodiments described and/or illustrated herein.

FIG. 9 is a block diagram of an exemplary computing system 900 capable of implementing and/or being used in connection with one or more of the embodiments described and/or illustrated herein. In some embodiments, all or a portion of computing system 900 may perform and/or be a means for performing, either alone or in combination with other elements, one or more of the steps described in connection with FIG. 10. All or a portion of computing system 900 may also perform and/or be a means for performing and/or implementing any other steps, methods, or processes described and/or illustrated herein. In one example, computing system 900 may include apparatus 100 from FIG. 1.

Computing system 900 broadly represents any type or form of electrical load, including a single or multi-processor computing device or system capable of executing computer-readable instructions. Examples of computing system 900 include, without limitation, workstations, laptops, client-side terminals, servers, distributed computing systems, mobile devices, network switches, network routers (e.g., PE routers, backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 900 may be programmed, configured, and/or otherwise designed to comply with one or more networking protocols. According to certain embodiments, computing system 900 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 900 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 900 may include various network and/or computing components. For example, computing system 900 may include at least one processor 914 and a system memory 916. Processor 914 generally represents any type or form of processing unit capable of processing data or interpreting and executing instructions. For example, processor 914 may represent an application-specific integrated circuit (ASIC), a system on a chip (e.g., a network processor), a hardware accelerator, a general purpose processor, and/or any other suitable processing element.

Processor 914 may process data according to one or more of the networking protocols discussed above. For example, processor 914 may execute or implement a portion of a protocol stack, may process packets, may perform memory operations (e.g., queuing packets for later processing), may execute end-user applications, and/or may perform any other processing tasks.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 900 may include both a volatile memory unit (such as, for example, system memory 916) and a non-volatile storage device (such as, for example, primary storage device 932, as described in detail below). System memory 916 may be implemented as shared memory and/or distributed memory in a network device. Furthermore, system memory 916 may store packets and/or other information used in networking operations.

In certain embodiments, exemplary computing system 900 may also include one or more components or elements in addition to processor 914 and system memory 916. For example, as illustrated in FIG. 9, computing system 900 may include a memory controller 918, an Input/Output (I/O) controller 920, and a communication interface 922, each of which may be interconnected via communication infrastructure 912. Communication infrastructure 912 generally represents any type or form of infrastructure capable of facilitating communication between one or more components of a computing device. Examples of communication infrastructure 912 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 918 generally represents any type or form of device capable of handling memory or data or controlling communication between one or more components of computing system 900. For example, in certain embodiments memory controller 918 may control communication between processor 914, system memory 916, and I/O controller 920 via communication infrastructure 912. In some embodiments, memory controller 918 may include a Direct Memory Access (DMA) unit that may transfer data (e.g., packets) to or from a link adapter.

I/O controller 920 generally represents any type or form of device or module capable of coordinating and/or controlling the input and output functions of a computing device. For example, in certain embodiments I/O controller 920 may control or facilitate transfer of data between one or more elements of computing system 900, such as processor 914, system memory 916, communication interface 922, and storage interface 930.

Communication interface 922 broadly represents any type or form of communication device or adapter capable of facilitating communication between exemplary computing system 900 and one or more additional devices. For example, in certain embodiments communication interface 922 may facilitate communication between computing system 900 and a private or public network including additional computing systems. Examples of communication interface 922 include, without limitation, a link adapter, a wired network interface (such as a network interface card), a wireless network interface (such as a wireless network interface card), and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 922 may also represent a host adapter configured to facilitate communication between computing system 900 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also enable computing system 900 to engage in distributed or remote computing. For example, communication interface 922 may receive instructions from a remote device or send instructions to a remote device for execution.

As illustrated in FIG. 9, exemplary computing system 900 may also include a primary storage device 932 and/or a backup storage device 934 coupled to communication infrastructure 912 via a storage interface 930. Storage devices 932 and 934 generally represent any type or form of storage device or medium capable of storing data and/or other computer-readable instructions. For example, storage devices 932 and 934 may represent a magnetic disk drive (e.g., a so-called hard drive), a solid state drive, a floppy disk drive, a magnetic tape drive, an optical disk drive, a flash drive, or the like. Storage interface 930 generally represents any type or form of interface or device for transferring data between storage devices 932 and 934 and other components of computing system 900.

In certain embodiments, storage devices 932 and 934 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 934 may also include other similar structures or devices for allowing computer software, data, or other computer-readable instructions to be loaded into computing system 900. For example, storage devices 932 and 934 may be configured to read and write software, data, or other computer-readable information. Storage devices 932 and 934 may be a part of computing system 900 or may be separate devices accessed through other interface systems.

Many other devices or subsystems may be connected to computing system 900. Conversely, all of the components and devices illustrated in FIG. 9 need not be present to practice the embodiments described and/or illustrated herein. The devices and subsystems referenced above may also be interconnected in different ways from those shown in FIG. 9. Computing system 900 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface.

Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    at least one storage device that facilitates storing forwarding information that enables a network device to forward traffic to other network devices within a network; and
    at least one processing unit of the network device that is communicatively coupled to the storage device, wherein the processing unit:
        identifies an initial forwarding key that corresponds to a forwarding feature of the network device;
        identifies a generator key that corresponds to a specific hardware component within the network device;
        computes an initial hash value that represents the initial forwarding key by performing a bitwise logical operation on the initial forwarding key that corresponds to the forwarding feature and the generator key that corresponds to the specific hardware component;
        identifies an additional forwarding key that corresponds to the forwarding feature of the network device;
        determines that the initial forwarding key and the additional forwarding key exceed a threshold level of similarity relative to one another;
        in response to determining that the initial forwarding key and the additional forwarding key exceed the threshold level of similarity, derives an additional hash value that represents the additional forwarding key by applying the initial forwarding key and the initial hash value as inputs to a hash function; and
        implements the additional hash value in connection with the forwarding feature of the network device and the forwarding information stored in the storage device.

2. The apparatus of claim 1, wherein:
    the forwarding information comprises a routing table that includes a set of routes that define paths to the other network devices within the network;
    the forwarding feature of the network device comprises hardware-based packet forwarding by the network device;
    the initial forwarding key comprises a route that defines a path to one of the other network devices within the network; and
    the additional forwarding key comprises an additional route that defines an additional path to another one of the other network devices within the network.

3. The apparatus of claim 2, wherein the processing unit implements the additional hash value in connection with the forwarding feature by applying the additional hash value as a unique key that facilitates looking up the additional route in the routing table.

4. The apparatus of claim 2, wherein the processing unit implements the additional hash value in connection with the forwarding feature by applying the additional hash value as an element of a Bloom filter that facilitates probabilistic route programming on the network device.

5. The apparatus of claim 1, wherein:
    the forwarding information comprises a routing table that includes a set of flows that facilitate forwarding traffic to the other network devices within the network;
    the forwarding feature of the network device comprises flow-based packet forwarding by the network device;
    the initial forwarding key comprises a flow that facilitates forwarding traffic to one of the other network devices within the network; and
    the additional forwarding key comprises an additional flow that facilitates forwarding traffic to one of the other network devices within the network.

6. The apparatus of claim 1, wherein the processing unit pre-computes the initial hash value a single time before the network device begins forwarding traffic to the other network devices within the network.

7. The apparatus of claim 6, wherein the processing unit:
    derives the additional hash value by applying the initial forwarding key and the pre-computed initial hash value as inputs to the hash function before the network device begins forwarding traffic to the other network devices within the network; and
    implements the additional hash value in connection with the forwarding feature by programming the routing table with the pre-computed additional hash value before the network device begins forwarding traffic to the other network devices within the network.

8. The apparatus of claim 7, wherein:
    the initial forwarding key comprises a route that defines a path to one of the other network devices within the network; and
    the additional forwarding key comprises the same route that defines the path to the one of the other network devices within the network;
    the processing unit:
        identifies an additional generator key that corresponds to an additional hardware component within the network device; and derives the additional hash value by applying the initial forwarding key, the additional generator key, and the pre-computed initial hash value as inputs to the hash function.

9. The apparatus of claim 7, wherein the processing unit:
   determines that the initial forwarding key and the additional forwarding key exceed the threshold level of similarity by determining that the initial forwarding key and the additional forwarding key differ by a single byte of data or less;
   derives the additional hash value by:
      identifying an index of the single byte of data corresponding to the initial forwarding key within the routing table;
      obtaining the single byte of data corresponding to the initial forwarding key from a memory location identified by the index;
      performing a logical exclusive OR (XOR) operation on the single byte of data to produce an XORed version of the single byte of data;
      replacing, within the initial forwarding key, the single byte of data with the XORed version of the single byte of data; and
      applying the initial forwarding key with the XORed version of the single byte of data as one of the inputs to the hash function.

10. The apparatus of claim 1, wherein the processing unit derives a further hash value that represents a further forwarding key by applying the additional forwarding key and the additional hash value as inputs to the hash function.

11. The apparatus of claim 10, wherein the processing unit recursively derives hash values for all possible forwarding keys within a given range used by the network device by, for each derived hash value, applying a predecessor forwarding key and a hash value corresponding to the predecessor forwarding key as inputs to the hash function.

12. The apparatus of claim 1, wherein the hash function comprises at least one logical exclusive OR (XOR) operation.

13. A network device comprising:
   at least one storage device that stores a routing table for a set of routes that define paths to other network devices within a network; and
   at least one processing unit that is communicatively coupled to the storage device, wherein the processing unit:
      identifies an initial forwarding key that corresponds to a forwarding feature of the network device;
      identifies a generator key that corresponds to a specific hardware component within the network device;
      computes an initial hash value that represents the initial forwarding key by performing a bitwise logical operation on the initial forwarding key that corresponds to the forwarding feature and the generator key that corresponds to the specific hardware component;
      identifies an additional forwarding key that corresponds to the forwarding feature of the network device;
      determines that the initial forwarding key and the additional forwarding key exceed a threshold level of similarity relative to one another;
      in response to determining that the initial forwarding key and the additional forwarding key exceed the threshold level of similarity, derives an additional hash value that represents the additional forwarding key by applying the initial forwarding key and the initial hash value as inputs to a hash function; and
      implementing the additional hash value in connection with the forwarding feature of the network device and the routing table stored in the storage device.

14. The network device of claim 13, wherein:
   the forwarding feature of the network device comprises hardware-based packet forwarding by the network device;
   the initial forwarding key comprises a route that defines a path to one of the other network devices within the network; and
   the additional forwarding key comprises an additional route that defines an additional path to another one of the other network devices within the network.

15. The network device of claim 14, wherein the processing unit implements the additional hash value in connection with the forwarding feature by applying the additional hash value as a unique key that facilitates looking up the additional route in the routing table.

16. The network device of claim 14, wherein the processing unit implements the additional hash value in connection with the forwarding feature by applying the additional hash value as an element of a bloom filter that facilitates probabilistic route programming on the network device.

17. The network device of claim 13, wherein the processing unit pre-computes the initial hash value a single time before the network device begins forwarding traffic to the other network devices within the network.

18. The network device of claim 17, wherein the processing unit:
   derives the additional hash value by applying the initial forwarding key and the pre-computed initial hash value as inputs to the hash function before the network device begins forwarding traffic to the other network devices within the network; and
   implements the additional hash value in connection with the forwarding feature by programming the routing table with the pre-computed additional hash value before the network device begins forwarding traffic to the other network devices within the network.

19. The network device of claim 18, wherein:
   the initial forwarding key comprises a route that defines a path to one of the other network devices within the network; and
   the additional forwarding key comprises the same route that defines the path to the one of the other network devices within the network;
   the processing unit:
      identifies an additional generator key that corresponds to an additional hardware component within the network device; and
      derives the additional hash value by applying the initial forwarding key, the additional generator key, and the pre-computed initial hash value as inputs to the hash function.

20. A method comprising:
   identifying an initial forwarding key that corresponds to a forwarding feature of a network device that facilitates forwarding traffic to other network devices within a network;
   identifying a generator key that corresponds to a specific hardware component within the network device;
   computing an initial hash value that represents the initial forwarding key by performing a bitwise logical operation on the initial forwarding key that corresponds to the forwarding feature and the generator key that corresponds to the specific hardware component;

identifying an additional forwarding key that corresponds to the forwarding feature of the network device;

determining that the initial forwarding key and the additional forwarding key exceed a threshold level of similarity relative to one another;

in response to determining that the initial forwarding key and the additional forwarding key exceed the threshold level of similarity, deriving an additional hash value that represents the additional forwarding key by applying the initial forwarding key and the initial hash value as inputs to a hash function; and implementing the additional hash value in connection with the forwarding feature of the network device.

* * * * *